Patented Aug. 7, 1951

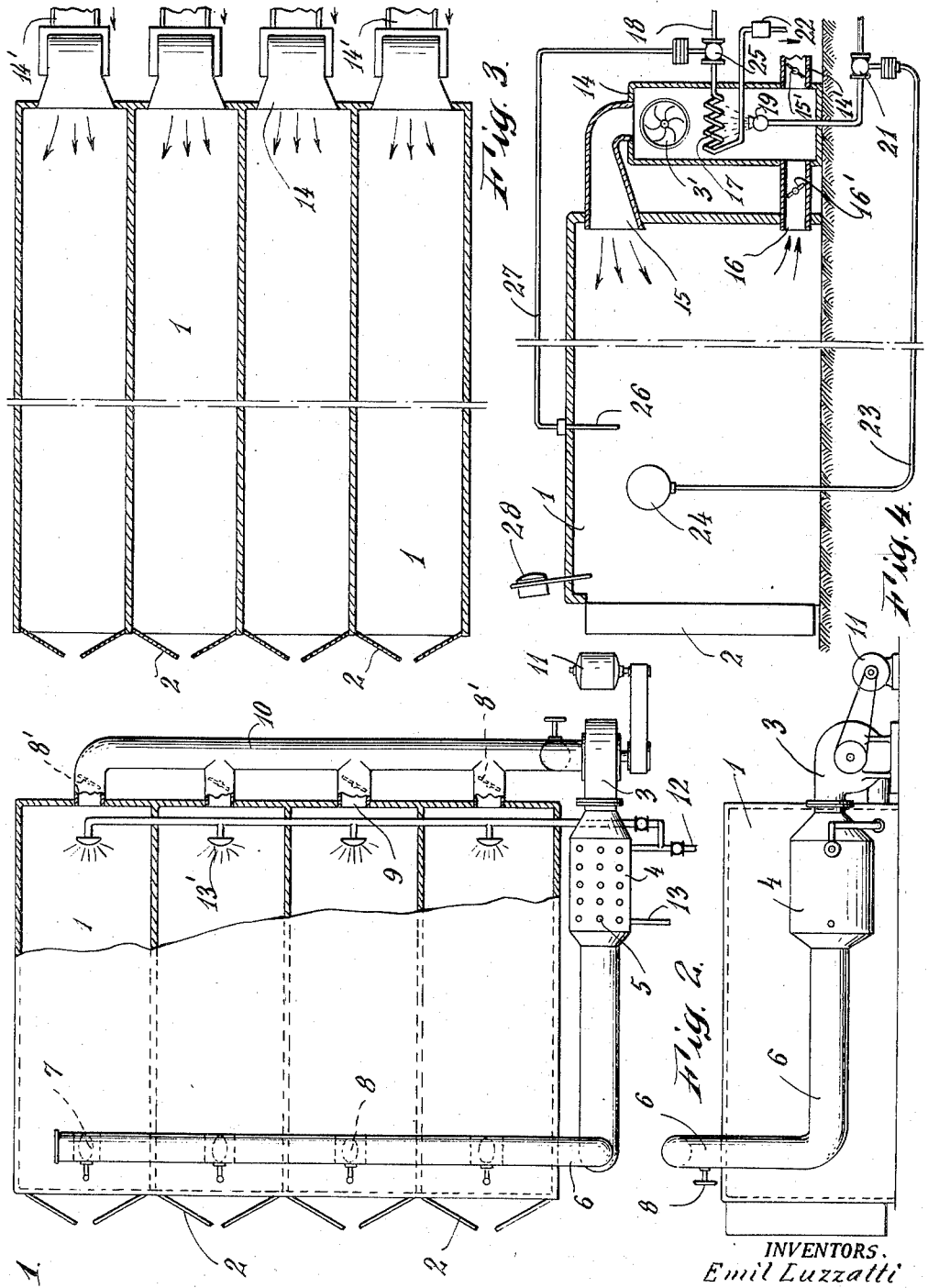

2,563,408

UNITED STATES PATENT OFFICE 2,563,408

APPARATUS FOR CURING BUILDING BLOCKS

Emil Luzzatti, Danbury, Conn., and Anthony L. Nugey, Rahway, N. J.

Application June 8, 1948, Serial No. 31,627

1 Claim. (Cl. 25—133)

Our invention is an improvement in apparatus for curing cinder blocks, bricks, slabs, and other structures.

A further object is to provide an apparatus for curing the blocks to a moisture content not exceeding 40% and thereby eliminate shrinkage to a minimum.

It is well known that cinders and ashes have been used in the manufacture of building blocks, and that cinders reduced to about ¾" in size have been selected for that purpose, as set forth in the patent to Straub, No. 1,212,840. Both cinders and ashes however, were taken without separation, and as they come from the furnace, are combined with cement and water in the block.

The patent issued to Luzzatti and Schloss, No. 1,711,027, was for an improvement over the invention of the Straub Patent No. 1,212,840. Luzzatti and Schloss found that a better building block would be obtained when comprised of about 3 parts of ground material, about 1 part of cement and sufficient water to bind, the ground material comprising cinders, free of all ashes, of about $\frac{1}{16}$ to ¼ of an inch in size and finely ground or coarse clam or oyster shells, or the equivalent in lime, in the proportion of about ¼ to about ¾ of the cinder. And after the blocks are moulded, these are placed in an enclosed steam chamber provided with entrance and exit doors and equipped with steam piping through which steam at 15 pounds and upwards is passed to facilitate drying the blocks by means of natural radiation. The blocks remaining in these heated chambers for about 18 to 24 hours during which period sufficient free steam is permitted to circulate to complete the setting of the blocks, and thereafter exposing the block thus formed in the open air preliminary to using same.

The present invention consists in improvements in the mixture for blocks and in the process for moulding and finishing same. We have discovered that a 50-50 mixture of coarse and fine cinder aggregates freed of all ashes and metals, and containing one part of ordinary Portland, or High Early cement for 9 to 12 parts of cinder aggregates as described above, with the addition of from 1 to 5% by weight of calcium chloride, will impart superior properties to a block of this class, and will further yield important advantages in the manufacture thereof.

The nature of the invention is fully disclosed hereinafter and the characteristics are pointed out in the claim. But while one type of mixture and mode of manufacture is set forth, we may adopt variations without departing from the general scheme by which our invention is distinguished.

On the drawings:

Figure 1 is a plan view of one design of apparatus for curing the blocks after formation.

Figure 2 is a side elevation thereof.

Figure 3 shows another installation; and

Figure 4 is a longitudinal cross-section of same.

The coarse cinders will be about ¼ inch in size and the fine about $\frac{1}{16}$ inch as described above. The chemical reaction between the cement constituents of the mixture and the calcium chloride with water neutralizes the sulphur trioxide and transforms other impurities into compatible compounds, and through action of a heating medium speeds up the hydration of the cement constituents. The chemical reaction is as follows:

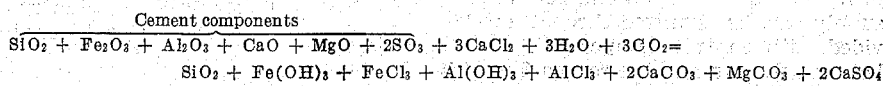

$$SiO_2 + Fe_2O_3 + Al_2O_3 + CaO + MgO + 2SO_3 + 3CaCl_2 + 3H_2O + 3CO_2 =$$
$$SiO_2 + Fe(OH)_3 + FeCl_3 + Al(OH)_3 + AlCl_3 + 2CaCO_3 + MgCO_3 + 2CaSO_4$$

We have discovered that by the use of calcium chloride ($CaCl_2$) the impurities, $Fe_2O_3$, MgO, $SO_3$ which are present in all cements, are converted into compatible compounds as illustrated in chemical reactions noted above. And in addition no excess calcium will be present in the cured blocks as prevailed in the blocks when clam or oyster shells, or the equivalent in lime was employed. Such excess of calcium was found to be detrimental. Other substances of equivalent effect as calcium chloride may of course be employed.

As stated in the Luzzatti and Schloss Patent No. 1,711,027 and as heretofore described, the blocks were required to remain in the heated chambers from 18 to 24 hours. Our invention affords the advantage that the blocks are cured within 10 to 16 hours if the heated chambers are provided with positive mechanical circulation with the application of the convection principle of heat transfer instead of the natural radiation principle relied upon by Luzzatti and Schloss aforesaid. We accomplish this by the construction which the drawings present.

Figures 1 and 2 show a structure in which any number of kilns 1 have entrance and exit doors 2 at the front leading to the curing chambers for charging and discharging the blocks. To permit a more orderly charge and discharge of blocks the entrance doors will be positioned in the front end and the exit doors at the rear end of the chambers. The chambers are supplied with a heated circulating medium kept in positive motion by a central fan 3. This fan discharges into the casing 4 which houses heating coils 5. From the casing 4 a supply flue 6 leads over the top of the kilns 1 and discharges into each chamber separately through openings indicated at 7 and controlled by dampers 8. Each of the kilns has an outlet opening 9 at the rear near the floor communicating through a return flue 10 with the inlet of the fan and each of these outlets may be provided with similar dampers 8'. The fan or unit 3 is driven by any suitable power unit, but more preferably by a motor 11. A valve controlled steam pipe 12 is connected to the heating coil 5 to heat the air or the circulating medium. The heating coil 5 condensate is drained through any suitable condensate trap which connects with condensate outlet 13 which may be used as boiler feed water. Each kiln 1 is equipped with a valved steam spray 13' the purpose of which is to admit sufficient quantities of free steam into the chambers. When the exit doors are placed in the rear of the chambers the return flue 10 is installed below the chamber floor and the outlet openings 9 are connected thereto.

Figures 3 and 4 show an alternate structure comprising any multiple number of kilns 1 arranged adjacent to each other with combined entrance and exit doors 2 in the front as before, but each kiln having a separate casing 14 set at the rear of each chamber which houses individual circulating fans, heating coils, and spray nozzles. The curing medium can be circulated through each of the chambers of the kilns separately. Each casing 14 contains a fan 3' which discharges through an opening 15 near the top and the recirculated medium is returned to the casing 14 through an opening 16 near the bottom which is provided with control damper 16'. Fresh air supply may be admitted through intake 14' provided with control damper 15'. In the casing between the fan and the return flue 16 is a heating coil 17 supplied with steam through a pipe 18; and just below the heating coil 17 is a steam (or hot water) spray nozzle 19 supplied through a pipe 20 controlled by a valve 21. The heating coil 17 is provided with any suitable condensate trap 22, and condensate therefrom is piped to boiler as feed water supply. The valve 21 is connected by a pipe 23 with a humidity controlling device 24 set within the chambers. The steam pipe 18 has a valve 25 controlled by a thermometer 26 connected to the valve by a pipe 27. Each kiln is also provided with a humidostat 28.

Having described our invention what we believe to be new is:

Apparatus for curing building blocks by convection, comprising a kiln, a fan casing, means forming flues connecting said casing to the interiod of said kiln at its upper part, a heater in said casing adjacent said fan, a conduit having a valve therein to admit a heating medium to the heater, a spray nozzle to admit steam into the casing adjacent said heater, a pipe having a valve therein to supply steam to the nozzle, a temperature responsive device in the kiln connected to the valve in the conduit to control the heater and a moisture responsive device in the kiln connected to the valve in the pipe to regulate the nozzle.

EMIL LUZZATTI.
ANTHONY L. NUGEY.

REFERENCES CITED

The following references are of record in the file of this patent:

UNITED STATES PATENTS

| Number | Name | Date |
|---|---|---|
| 965,003 | Pauly | July 19, 1910 |
| 1,212,840 | Straub | Jan. 16, 1917 |
| 1,264,142 | Bellonby | Apr. 30, 1918 |
| 1,340,633 | Silva | May 18, 1920 |
| 1,594,315 | Minter | July 27, 1926 |
| 2,274,426 | Miller | Feb. 24, 1942 |

FOREIGN PATENTS

| Number | Country | Date |
|---|---|---|
| 415,061 | Great Britain | Aug. 15, 1934 |